US008084013B2

(12) United States Patent
Tonjes et al.

(10) Patent No.: US 8,084,013 B2
(45) Date of Patent: Dec. 27, 2011

(54) METHOD AND APPARATUS FOR DEGASIFICATION OF CLAUS-DERIVED SULFUR

(75) Inventors: Mark R. Tonjes, Shawnee, KS (US); David K. Stevens, Prairie Village, KS (US); Lindsay D. Dreitzler, Overland Park, KS (US); Alan D. Mosher, Overland Park, KS (US)

(73) Assignee: KPS Technology & Engineering LLC, Overland Park, KS (US)

( * ) Notice: Subject to any disclaimer, the term of this patent is extended or adjusted under 35 U.S.C. 154(b) by 0 days.

(21) Appl. No.: 12/840,820

(22) Filed: Jul. 21, 2010

(65) Prior Publication Data

US 2011/0020212 A1    Jan. 27, 2011

Related U.S. Application Data

(60) Provisional application No. 61/227,557, filed on Jul. 22, 2009.

(51) Int. Cl.
*C01B 17/027*    (2006.01)
(52) U.S. Cl. ................................. 423/578.1; 422/255
(58) Field of Classification Search ........... 423/578.1; 422/255
See application file for complete search history.

(56) References Cited

U.S. PATENT DOCUMENTS

| 4,131,437 A | 12/1978 | Campbell |
| 4,729,887 A | 3/1988 | Pendergraft |
| 4,844,720 A | 7/1989 | Pendergraft |
| 5,080,695 A | 1/1992 | Kassarjian |
| 5,632,967 A | 5/1997 | Nasato |
| 5,935,548 A * | 8/1999 | Franklin et al. ............. 423/578.1 |
| 6,149,887 A | 11/2000 | Lagas |
| 7,081,233 B2 | 7/2006 | Louie |
| 2005/0260121 A1* | 11/2005 | Louie .......................... 423/578.1 |

OTHER PUBLICATIONS

Lagas, J.A., "Stop Emissions from Liquid Sulfur," Hydrocarbon Processing, Oct. 1982, pp. 85-89, Gulf Publishing Co., Houston, TX, U.S.A.
Schwalm, W.J. and Hyne, J.B., "A Review of Elemental Sulphur Degassing," ASRL Quarterly Bulletin, Jan.-Mar. 1986, pp. 33-57, vol. XXII, No. 4, Alberta Sulphur Research Ltd., Calgary, Canada.
Clark, P.D., McDonald, T.L. and Lesage, K.L., "Studies on the Release of H2S from Liquid Sulfur," ASRL Quarterly Bulletin, Jul. 1992-Mar. 1993, pp. 43-60, vol. XXIX, Nos. 2, 3 & 4, Alberta Sulphur Research Ltd., Calgary, Canada.
Clark, P.D., Lesage, K.L., McDonald, T.L., Mason, A. and Neufeld, A.K., "Investigations into the Chemical Mechanisms of Liquid Sulfur Degassing and their Relevance to Industrial Degassing Systems," ASRL Quarterly Bulletin, Apr.-Jun. 1994, pp. 23-64, vol. XXXI, No. 1, Alberta Sulphur Research Ltd., Calgary, Canada.
Johnson, J. E. and Hatcher, N.A., "A Comparison of Established Sulfur Degassing Technologies," 53rd Annual Laurance Reid Gas Conditioning Conference, Feb. 2003, pp. 131-139, Norman, OK, U.S.A.

* cited by examiner

*Primary Examiner* — Timothy Vanoy
(74) *Attorney, Agent, or Firm* — Douglas J. Edmonds

(57) ABSTRACT

A method and apparatus for degasification of Claus-derived sulfur by the use of gas-liquid eductor using the liquid sulfur as the ejector motive force and ambient sweep air as the active degassing agent combined with a static mixer and packed bed for promoting the intimate contact of the air and the sulfur.

11 Claims, 4 Drawing Sheets

METHOD AND APPARATUS FOR DEGASIFICATION OF CLAUS-DERIVED SULFUR

RELATED APPLICATION

The present non-provisional patent application is related to and claims priority benefit of an earlier-filed provisional patent application titled METHOD AND APPARATUS FOR DEGASIFICATION OF CLAUS-DERIVED SULFUR, Ser. No. 61/227,557, filed 22 Jul. 2009. The identified earlier-filed application is hereby incorporated by reference into the present application.

FIELD OF THE INVENTION

The present invention relates to the removal of hydrogen sulfide and hydrogen polysulfides from the elemental sulfur produced by the Claus process using a gas-liquid ejector and where the motive force for the ejector is pumped liquid sulfur and ambient air is used as the active degassing agent and a static mixer and packed bed is employed to provide intimate contact between the air and the sulfur.

BACKGROUND OF THE INVENTION

Liquid sulfur produced by the Claus sulfur recovery process contains significant amounts of dissolved hydrogen sulfide ($H_2S$). The release of this $H_2S$ from the sulfur presents a number of serious safety and environmental concerns, ranging from explosions and toxic personnel exposure to localized nuisance odors. The preferred method for coping with these problems is to remove or "degas" the $H_2S$ from the liquid sulfur product prior to its subsequent storage, handling, and/or forming.

The process chemistry for $H_2S$ in Claus-produced liquid sulfur can be summarized as:

$H_2S$ present in the Claus process gases is at a significant partial pressure within a Claus plant and is thus dissolved in the liquid sulfur produced in the Claus sulfur condensers.

This dissolved $H_2S$ is subsequently liberated in downstream storage facilities when the sulfur cools and is exposed to lower atmospheric pressure conditions where the partial pressure becomes essentially zero.

The equilibrium concentration of $H_2S$ in liquid sulfur under atmospheric conditions is quite low (<10 ppmw) which is much less than the $H_2S$ content of liquid sulfur produced from the Claus process ($\approx$200-400 ppmw). Therefore, the natural result is the liberation of $H_2S$ gas. The purpose of degassing is to remove the $H_2S$ in an accelerated and controlled manner, and then properly dispose of it in a safe location and in an environmentally-friendly manner. There are five main reasons for degassing liquid sulfur:

1. Reduce Toxicity—$H_2S$ is an extremely toxic gas that is immediately fatal at concentrations greater than 1000 ppmv.
2. Reduce Explosive Hazards—$H_2S$ forms an explosive mixture in air at concentrations from 3.4 to 46 vol % at normal sulfur storage temperatures. This level is readily achieved in the headspace of downstream sulfur storage equipment if the sulfur is not degassed and/or the equipment is not properly vented.
3. Reduce Emissions—Undegassed liquid and formed sulfur products emit $H_2S$ to the atmosphere and give off noxious odors. Degassing the sulfur allows the $H_2S$ to be recovered and properly processed.
4. Improve Formed Sulfur Product—Solid sulfur formed from degassed sulfur is less prone to fracture. The presence of $H_2S$ gas in the formed product produces voids and surface imperfections that weaken the solid, making it more susceptible to breakage during handling and transport. This creates sulfur dust and releases the malodorous $H_2S$.
5. Reduce Corrosion—$H_2S$ is corrosive to carbon steel, especially in a wet environment, and can cause corrosion in storage equipment and piping, as well as trucks, tank cars, and ships. Degassing the liquid sulfur helps to reduce corrosion in all downstream devices.

Since $H_2S$ is slightly heavier than air, it can accumulate in confined spaces instead of being readily dispersed. This property will exacerbate the environmental concerns expressed above, especially with regards to personnel exposure.

There is no world-wide, universally accepted standard for degassed liquid sulfur. Sulfur degassing standards are expressed as total ($H_2S+H_2S_X$) ppm by weight as $H_2S$. The first degassed sulfur standards were developed in western Canada to address problems encountered when shipping large volumes of sulfur in rail tank cars. Contemporary standards are 30 ppmw in western Canada and 10 ppmw for Europe. China has also adopted a 10 ppmw standard. There are no statutory requirements in the United States, but many facilities reduce the content to satisfy particular customers of their liquid sulfur product.

Although the process description in the preceding section is nominally correct, the exact details and mechanisms of the chemistry of $H_2S$ exchange with liquid sulfur are much more complicated. Understanding the various chemical reactions and the appearance of intermediate chemical species is crucial to understanding the sulfur degassing process. More importantly, knowledge of this chemistry can be exploited to develop suitable degassing strategies. This section briefly describes the process chemistry of these physio-chemical interactions.

Pure elemental liquid sulfur at atmospheric pressure and at a temperature nominally above its melting point (245F), generally exists as an $S_8$ molecule in a ring structure. At higher temperatures (>300F), a significant fraction of the $S_8$ rings convert to a straight-chain structure. When elemental liquid sulfur exists as a straight-chain molecule, it can form polymers of varying chain length, sometimes on the order of thousands of units. For the general purposes, the chemical reaction can be written as:

$$S_{8\,(Ring)} \xrightleftharpoons{>300\,F.} \frac{X}{8} S_{8\,(Straight\,Chain)} \rightleftharpoons S_{X\,(Polymeric)} \quad (\text{eq-1})$$

It is the presence of the polymeric form at normal Claus condenser temperatures that complicates the physio-chemical interactions between $H_2S$ and liquid sulfur.

There is an equilibrium relationship between $H_2S$ in the vapor phase (either in the Claus tail gas or in the headspace of liquid sulfur storage equipment) and $H_2S$ dissolved in liquid sulfur. As with most gas solubility relationships, this dissolution is reversible and depends on the partial pressure of the $H_2S$ in the vapor phase and the temperature of the liquid sulfur. The equilibrium exchange of $H_2S$ between the vapor and liquid phases is relatively fast (eq-2). However, once the $H_2S$ is dissolved in the produced liquid sulfur, it can react with polymeric liquid sulfur to form polysulfide compounds (eq-3).

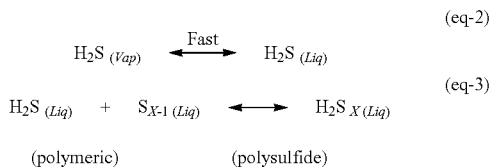

(eq-2)
(eq-3)

The formation of the polysulfide is relatively fast under Claus conditions, while the decomposition of the polysulfide back to $H_2S$ is relatively slow. The equilibrium distribution between the sulfide and the polysulfide forms is highly temperature dependent: the higher the temperature, the greater the fraction in the polysulfide form (see Table 1). At a temperature of 320F, the equilibrium $H_2S/H_2S_X$ ratio is close to 0.6. At 257F, the ratio is more than 3. This means that the $H_2S$ in the hot Claus gas is rapidly dissolved into the liquid sulfur and then quickly forms polysulfides. As the sulfur cools and the $H_2S$ partial pressure is reduced in the downstream storage equipment, there is a slow natural release of $H_2S$ from the liquid sulfur. The $H_2S_X$ in the liquid gradually equilibrates back to $H_2S$ (eq-3 in reverse). Then the dissolved $H_2S$ that is in contact with the vapor space rapidly evolves out of solution (eq-2 in reverse). $H_2S$ dissolved in liquid that is not in contact with the vapor space will not be able to equilibrate with the vapor and evolve out of solution.

The liquid sulfur from a Claus SRU is usually collected in a storage tank, vessel, or below-grade concrete pit. This containment equipment usually operates under an air atmosphere. Initial studies concerning the influence of air were based on rail car studies that observed that the degassing rate was directly proportional to the liquid surface area and the $H_2S$ content.

Alberta Sulphur Research Ltd. (ASRL) research has shown that there a number of reactions between the dissolved sulfides and oxygen. Because of the nature of the testing systems and the difficulty of accurately measuring all of the reaction species in each the phases, the extent of the contribution of each of the oxidation reactions is difficult to quantify. However, reasonable qualitative assessments have been made based on the observed behavior.

The sulfides can be partially oxidized with air (oxygen) according to eq 4 & 5 or more completely oxidized via equation 6 & 7 below.

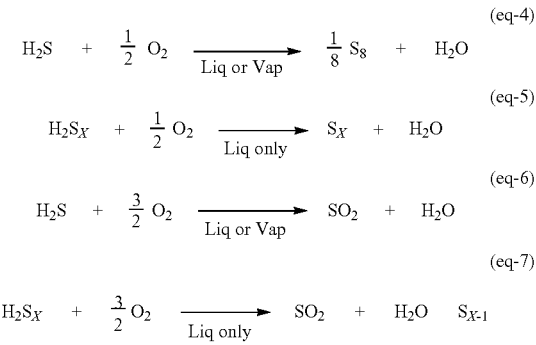

(eq-4)
(eq-5)
(eq-6)
(eq-7)

Experiments confirm the appearance of $SO_2$ in the vapor, but only when there is also $H_2S/H_2S_X$ present in the liquid. Once the $H_2S$ evolves and is swept away, no more $SO_2$ is formed. This rules out direct oxidation of elemental sulfur:

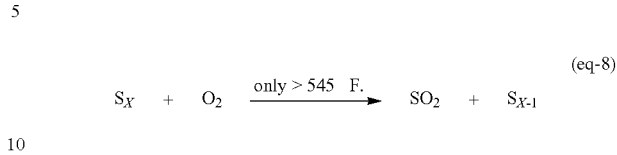

(eq-8)

It is also speculated that the Claus reaction occurs, but only to a small extent. This could occur via eqs 9 & 10

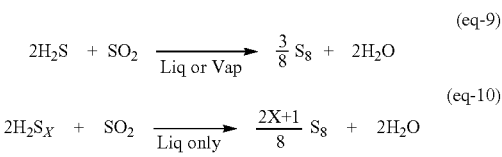

(eq-9)
(eq-10)

From the preceding description of the reactions of oxygen, hydrogen sulfide and sulfur at conditions normally encountered in industrial Claus sulfur recovery units, it can be seen that degasification using air is a convenient and practical approach. There are several commercially-proven processes which exploit this concept. The feature of the majority of these other processes is the source of air is from an external supply at pressure (i.e., through the use of an air compressor). Of these processes several different approaches are used to provide the intimate contact of air and the sulfur (e.g., auto-recirculation boxes, spargers, packed beds, spray towers). The main disadvantage of these existing processes is that the quantity of air used to degas the sulfur exceeds the minimum required to control the sweep air rate hydrogen sulfide lower explosive limit which leads to excess emissions of sulfur.

It is noted that for degasification of sulfur that the temperature of the process is important, decomposition of hydrogen polysulfides is best promoted by cooling the liquid sulfur to 265-285F to shift the $H_2S_X \leftrightarrows H_2S$ equilibrium distribution towards $H_2S$, while still keeping the liquid sulfur safely above its melting point (245F). Also, cooler sulfur temperatures can significantly reduce sulfur viscosity, resulting in better liquid/vapor interfacial contact (i.e., liquid sulfur/air).

SUMMARY OF THE INVENTION

This invention utilizes the physical and chemical characteristics of contacting liquid sulfur containing dissolved hydrogen sulfide with air to effectively accomplish the degasification through the intensity of the mixing/turbulence and interfacial contact between the liquid sulfur and the air.

The physio-chemical steps within the process can be described as follows:

1. Decomposition of $H_2S_X$ to $H_2S$
2. Evolution of $H_2S$ from liquid to vapor phase
3. Removal of $H_2S$ from vapor space Of these three steps, Step 1 is by far the most difficult and is the rate-determining step for the degassing process. Step 2 is relatively easy to achieve by the mixing/agitation of the liquid sulfur and occurs as a result of processing step 1. Step 3 is also relatively easy to achieve, as in this process the liquid sulfur is stored under an air atmosphere and the vapor space is swept with ambient air. This is done to prevent $H_2S$ build-up to explosive limits. (A sweep air rate is typically maintained to keep the $H_2S$ concentration <¼% of the lower explosion limit [LEL]).

To accomplish the above three steps, the apparatus consists of a gas-liquid eductor to introduce the air into the sulfur. This is done using the pumped liquid sulfur as a motive force for an eductor employed in such a way that ambient air is the suction fluid. Additional contacting of the air/liquid sulfur is accomplished by passing the mixture through a static mixing device and then on to an up-flow co-current packed bed. By virtue of the aforementioned air/liquid sulfur contact the physiochemical Steps 1 and 2 as described above are accomplished. The removal of the nascent hydrogen sulfide in the vapor space, Step 3, is accomplished by maintaining a constant flow of air over the top of the liquid sulfur by having an air inlet where ambient air is either drawn or pressurized from the atmosphere over the liquid sulfur and having an air outlet where the hydrogen sulfide bearing air is removed. The novelty of this process is that the air utilized for the degassing effect, Step 1 and 2, is recycled within the process and the net air flow through the system is solely based upon the requirements of Step 3.

DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
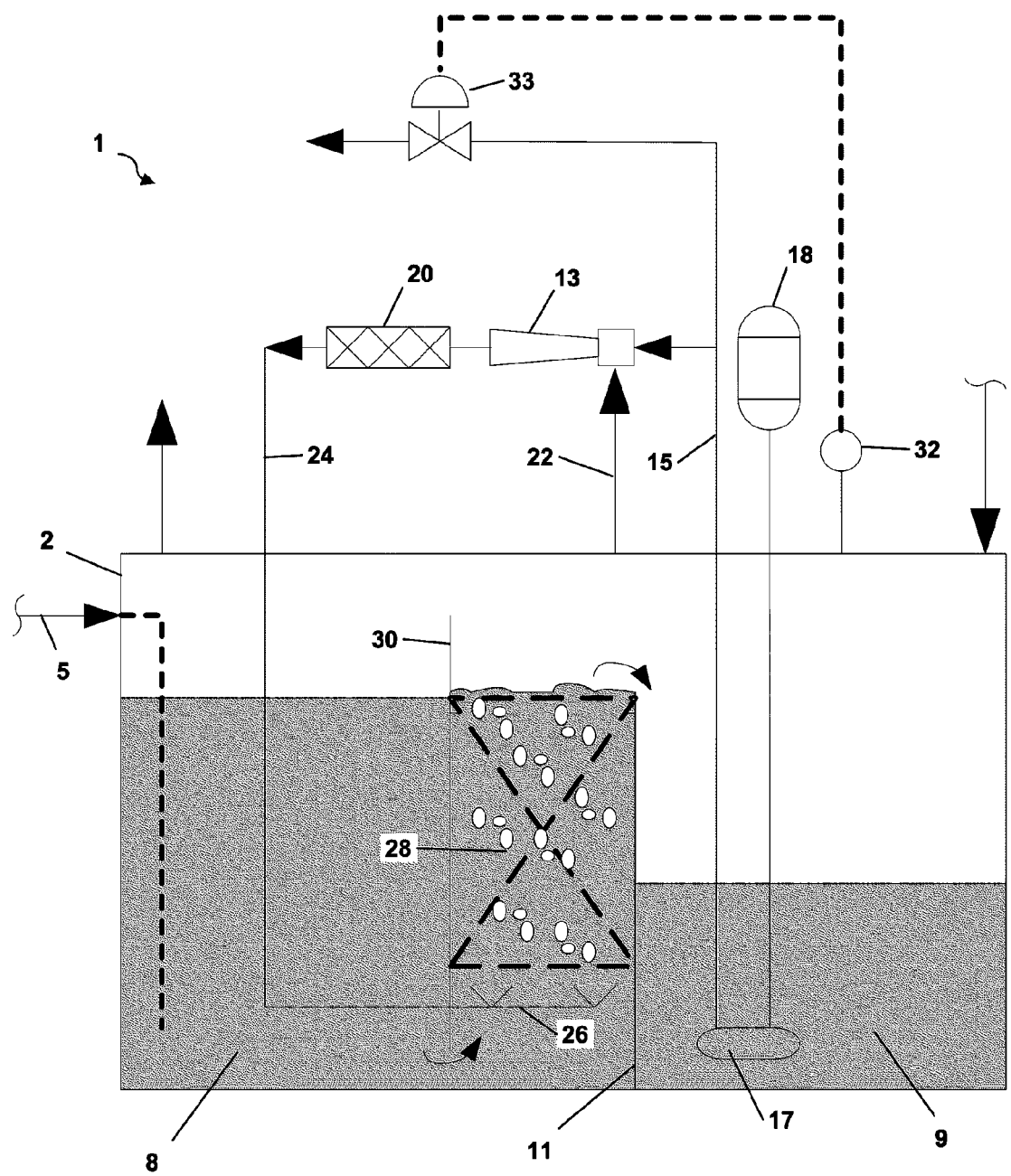
FIG. 1. is a block flow diagram of an apparatus for degasification of Claus-derived sulfur in accordance with the present invention.

The sulfur degasification process shown in FIG. 1 occurs in degasification apparatus 1 which includes a vessel 2 that receives liquid rundown sulfur via line 5 from an upstream Claus sulfur condenser (not shown). The vessel 2 contains a constant level degassing chamber 8 and a pumping chamber 9 that are separated by a wall 11. In operation, the level of liquid sulfur is generally constant in degassing chamber 8 and varies in pumping chamber 9.

The sulfur degasification process uses an eductor 13, which receives a recirculating sulfur stream via line 15 from pumping chamber 9. The sulfur stream is recirculated through pump discharge line 15 by means of an impeller 17 powered by motor 18. Vapor space air from the vessel 2 is supplied to the eductor 13 via supply line 22. The recirculating liquid sulfur stream serves as a motive fluid to boost the vapor space air into the liquid sulfur within the eductor 13. Immediately downstream of the eductor 13 is an in-line static mixer 20, which turbulently pre-mixes the educted air with the recirculating sulfur. The resulting sulfur-air mixture is then discharged via discharge line 24 from the mixer 20. Discharge line 24 supplies the sulfur-air mixture to distributor 26 underneath a fixed degassing bed 28 submerged in the liquid sulfur within the first degassing chamber 8. The fixed degassing bed 28 is retained between a first baffle 30 and wall 11. The first baffle 30 is positioned as shown to allow liquid sulfur to flow under the first baffle 30 to mix with the sulfur-air mixture. Co-current upflow through the fixed bed 28 provides mechanical agitation and further air dispersion, increasing interfacial contact between the phases. Degassed sulfur flows from the top of the fixed degassing bed 28 over wall 11 into the pumping chamber 9.

The degassed sulfur is exported from the pumping chamber 9 by means of a level control 32 and valve 33 from a slipstream in the pump discharge line 15. The processing scheme illustrated in FIG. 1 consists of a single stage. Multiple stages can be placed in series to reduce the $H_2S$ content to the desired specification, as described below.

Figure 2:
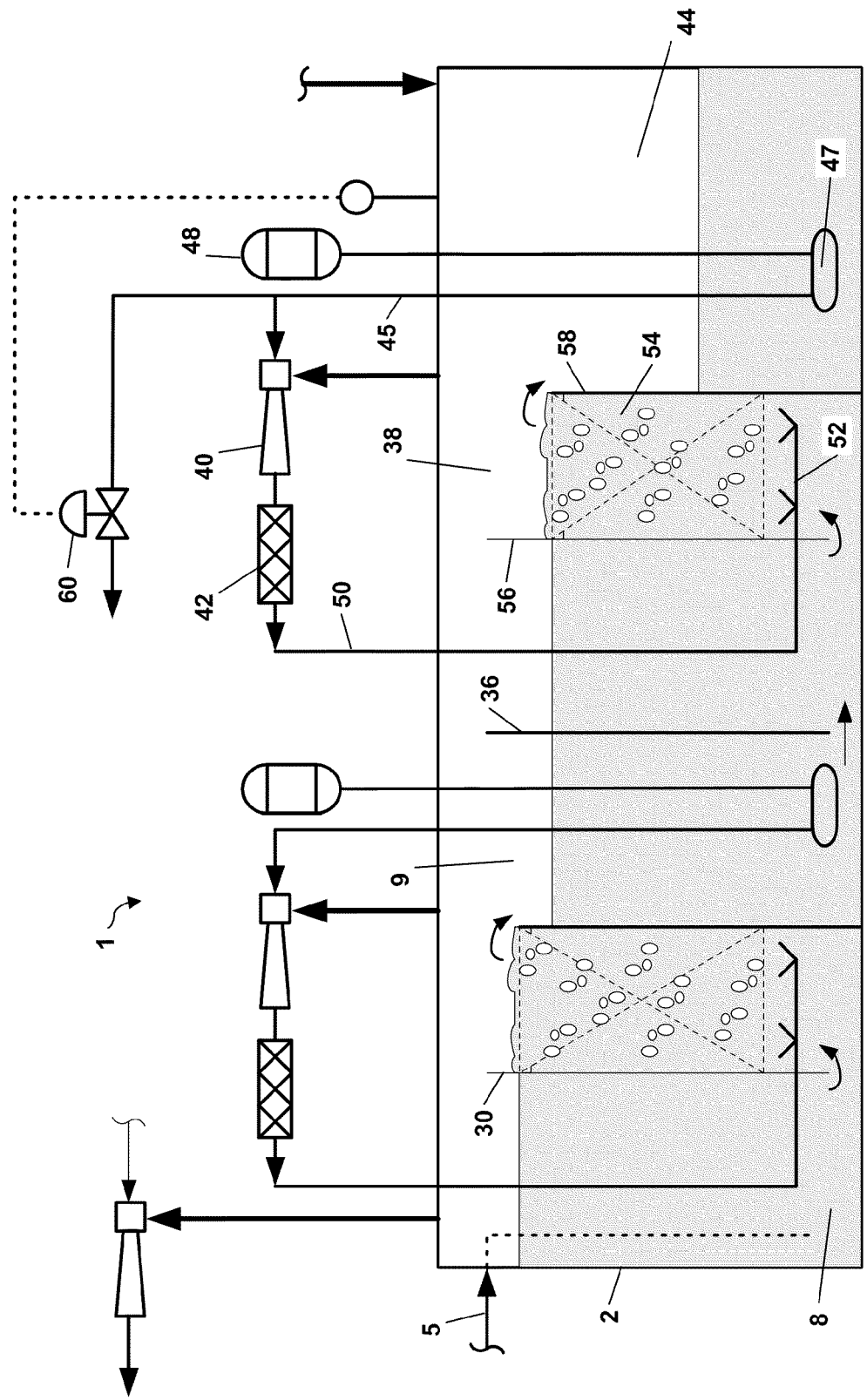
FIG. 2. is a block flow diagram of a modified embodiment of the apparatus for degasification of Claus-derived sulfur showing a two-stage horizontal configuration.

FIG. 2 illustrates a representative arrangement for a grassroots installation in a below-grade atmospheric sulfur pit comprising a two-stage process. The undegassed rundown sulfur enters into the degassing chamber 8 via line 5 on the left. The sulfur in the degassing chamber 8 flows to the bottom of the fixed degassing bed 28 along with the sulfur-air mixture that is discharged through the distributor 26 underneath the fixed degassing bed 28. The two-phase mixture flows co-currently up through the bed 28. At the top of the bed 28, liquid sulfur overflows into the pumping chamber 9 while the air rises into the vapor space. The sulfur in the pumping chamber 9 is continuously recirculated back to the fixed degassing bed 28 as previously described.

In this embodiment, the partially degassed sulfur from the first stage flows underneath a second baffle 36 into a secondary degassing chamber 38. As in the first stage, the secondary degassing chamber 38 includes a secondary eductor 40 and static mixer 42 that mix and educt the recirculating sulfur stream from a secondary pumping chamber 44 that function in the same manner as in the first stage. The sulfur stream is recirculated from the secondary pumping chamber 44 via a secondary pump discharge line 45, impeller 47 and motor 48.

A secondary discharge line 50 from the mixer 42 to a secondary distributor 52, through which the sulfur-air mixture flows into a secondary fixed bed 54 for mechanical agitation and further air dispersion. The secondary fixed bed 54 is retained between a third baffle 56 and second wall 58.

The bed elevations are fixed such that the first pumping chamber 9 has a constant level that is slightly lower than the overflow from the first fixed bed 28 and the same level as the secondary degassing chamber 38. The second degassing stage operates the same as the first stage. The secondary pumping chamber 44 also serves as the degassed sulfur surge volume. The level in the secondary pumping chamber 44 is maintained by a level control valve 60 in the pump discharge. A steam ejector, air blower or pressurized air source is used to sweep the vapor space with ambient air. The ambient sweep air generally flows counter-currently with respect to the sulfur flow. The steam and contaminated air from the eductor flow to a disposal location, which is typically an incinerator or the Claus thermal section.

Figure 3:
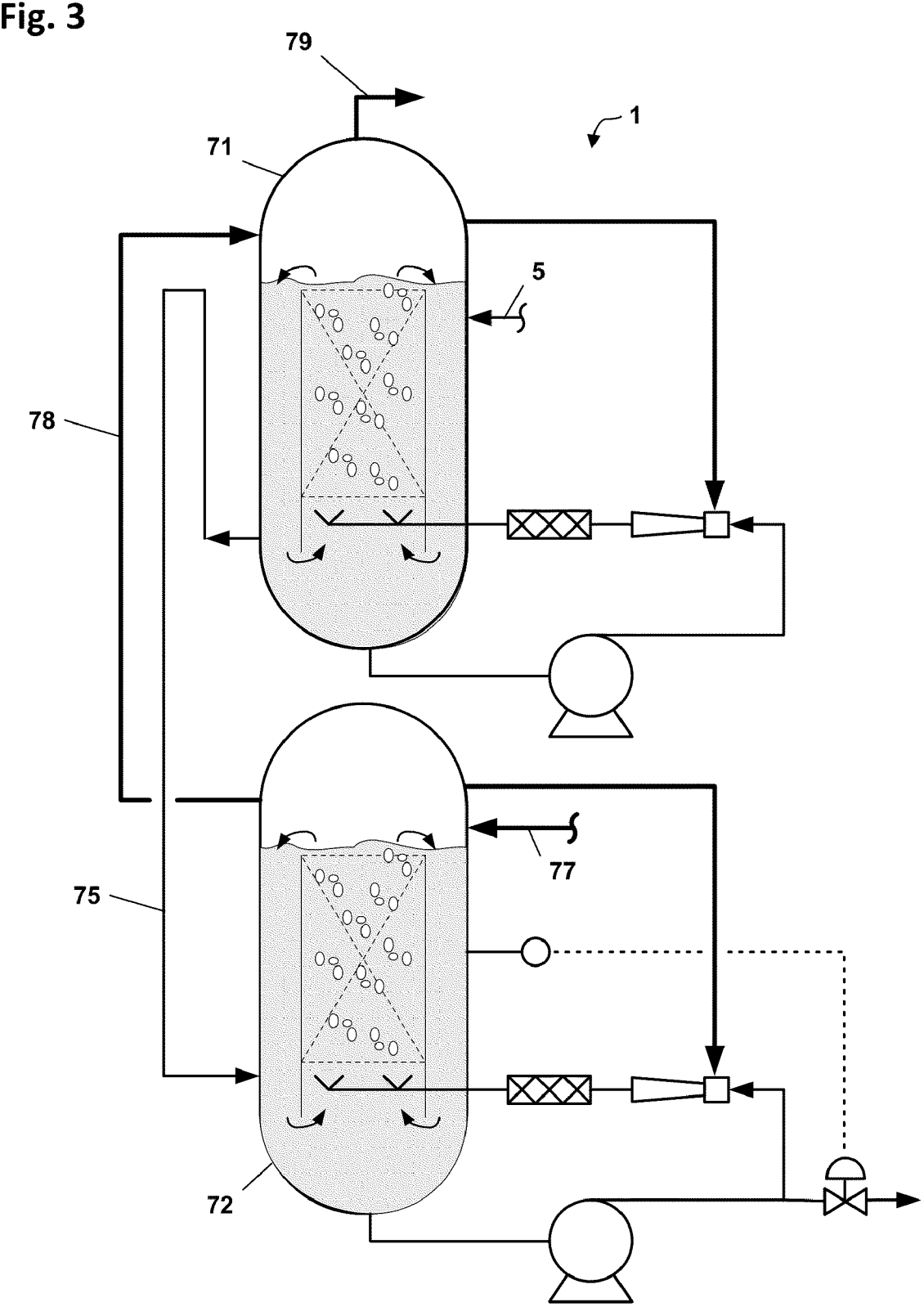
FIG. 3. is a block flow diagram of a modified embodiment of the apparatus for degasification of Claus-derived sulfur showing a two-stage vertically stacked configuration.
Figure 4:
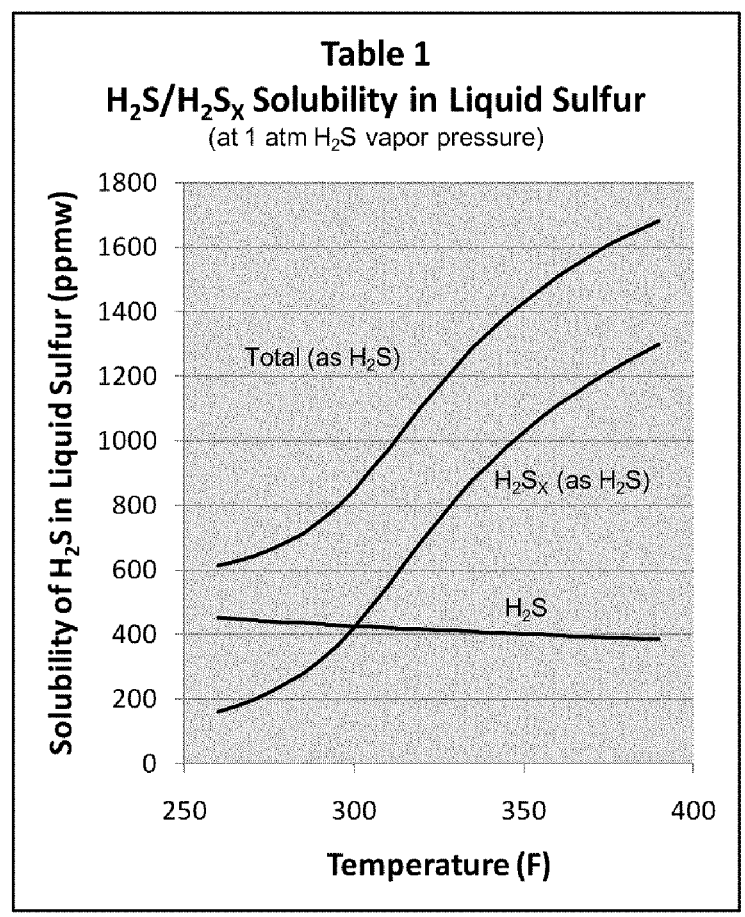
FIG. 4. is a graph designated as "Table 1—H2S/H2SX Solubility in Liquid Sulfur."

FIG. 3 illustrates a representative arrangement for either a grass roots facility or a retrofit using a vertical stacked arrangement. In this scheme, a first stage degassing vessel 71 is stacked above a second stage degassing vessel 72. Liquid sulfur is supplied via line 5 to the first stage degassing vessel 71, typically from a sulfur pump located in a sulfur pit or other rundown vessel (not shown). The sulfur is recirculated in the first stage degassing vessel 71 similar to the description for FIG. 1, with only different elements being discussed here. The net sulfur flows from the first stage degassing vessel 71 to the second stage degassing vessel 72 via an overflow seal loop 75 which maintains the level in the first stage degassing vessel 71. The second stage degassing vessel 72 operates similar to the first stage degassing vessel 71, except that the level is maintained via level control on pump discharge. The sweep air enters the second stage degassing vessel 72 via line 77, sweeps the vapor space and then flows via line 78 to the first stage degassing vessel 71 before flowing to the disposal location via line 79.

The main advantage of the pressure vessel arrangement illustrated in FIG. 3 is the ability to operate at a pressure higher than ambient. This allows the use of Claus combustion air for sweeping, which provides two distinct advantages: (1) the contaminated vent can flow under pressure to the disposal destination without being boosted by an ejector; and (2) the waste vent stream will not contain any steam/water from the ejector motive fluid. Both of these are especially advantageous when the vent is being recycled to the front of the Claus unit.

It is to be understood that while certain forms of the present invention have been illustrated and described herein, it is not to be limited to the specific forms or arrangement of parts described and shown.

What is claimed and desired to be secured by Letters Patent is as follows:

1. A method for the degasification of Claus-derived sulfur, the method comprising:
   a. Pumping liquid sulfur in a sulfur collection vessel through a gas-liquid eductor whereas the air inside the sulfur collection vessel is drawn into an eductor where it is intimately contacted with the pumped liquid sulfur;
   b. The two-phase mixture of air and sulfur leaving the eductor is further intimately mixed by passing the mixture through a static mixer;
   c. The two-phase mixture leaving the static mixer is directed to the bottom of the sulfur collection vessel where the mixture is discharged up through a layer of packing where further contacting is effected; and
   d. The air and sulfur separate as the sulfur reaches the top of the packed section whereas part of the air, containing the liberated hydrogen sulfide, is recycled back through the process through the gas-liquid eductor and the balance of the air is removed from the sulfur collection vessel through the use of a gas-gas ejector or blower.

2. The method of claim 1 wherein the sulfur recirculation rate is 5 to 15 times the net sulfur production rate from the Claus sulfur recovery plant.

3. The method of claim 1 where the number of stages as described as a single stage in claim 1 may be between 1 and 5.

4. The method of claim 1 where the air flow through the sulfur collection vessel is maintained at such a rate that the hydrogen sulfide content of the air in the sulfur collection vessel is less than 3.4% by volume.

5. The method of claim 1 where the packed section is constructed from a group of chemically-inert materials consisting of dumped packing, structured packing or other static mixing device.

6. The method of claim 1 where the packed section is composed of a bed of Claus catalyst selected from the group consisting of activated alumina, promoted activated alumina or titanium dioxide.

7. The method of claim 1 where the temperature of the liquid sulfur in the sulfur collection vessel is maintained between 250 and 300 degree F.

8. The method of claim 1 where the pressure inside the sulfur collection vessel is maintained between slightly below atmospheric pressure to that of 50 psig.

9. The method of claim 1 where a source of sweep air is introduced through a sparger located at the bottom of the packed bed section.

10. An apparatus for the degasification of Claus-derived sulfur, the apparatus comprising:
    a. a gas-liquid eductor through which liquid sulfur in a sulfur collection vessel is pumped whereas the air inside the sulfur collection vessel is drawn into the eductor where it is intimately contacted with the pumped liquid sulfur;
    b. a static mixer through which the two-phase mixture of air and sulfur leaving the eductor is further intimately mixed by passing the mixture through the static mixer;
    c. The two-phase mixture leaving the static mixer is directed to the bottom of the sulfur collection vessel where the mixture is discharged up through a layer of packing where further contacting is effected; and
    d. whereby the air and sulfur separate as the sulfur reaches the top of the packed section whereas part of the air, containing the liberated hydrogen sulfide, is recycled back through the process through the gas-liquid eductor and the balance of the air is removed from the sulfur collection vessel through the use of a gas-gas ejector or blower.

11. The apparatus of claim 10 where the number of stages as described as a single stage in claim 10 may be between 1 and 5.

* * * * *